United States Patent
Kleine et al.

(10) Patent No.: US 12,540,681 B2
(45) Date of Patent: Feb. 3, 2026

(54) ARRANGEMENT FOR BLOCKING OR UNBLOCKING A FLUID FLOW

(71) Applicant: REMBE GmbH Safety + Control, Brilon (DE)

(72) Inventors: Daniel Kleine, Brilon (DE); Sebastian Kluge, Brilon (DE); Stefan Penno, Brilon (DE)

(73) Assignee: REMBE GmbH Safety + Control, Brilon (DE)

( * ) Notice: Subject to any disclaimer, the term of this patent is extended or adjusted under 35 U.S.C. 154(b) by 0 days.

(21) Appl. No.: 18/490,009

(22) Filed: Oct. 19, 2023

(65) Prior Publication Data

US 2024/0133476 A1 Apr. 25, 2024
US 2024/0229953 A9 Jul. 11, 2024

(30) Foreign Application Priority Data

Oct. 19, 2022 (EP) .................................. 22202569

(51) Int. Cl.
*F16K 17/40* (2006.01)
*F16K 17/16* (2006.01)
*F16K 37/00* (2006.01)

(52) U.S. Cl.
CPC ........ *F16K 17/403* (2013.01); *F16K 17/1606* (2013.01); *F16K 17/1613* (2013.01); *F16K 37/0041* (2013.01)

(58) Field of Classification Search
CPC ............... F16K 17/403; F16K 17/1613; F16K 17/1606; F16K 37/0041

(Continued)

(56) References Cited

U.S. PATENT DOCUMENTS 2,766,904 A * 10/1956 Philip ................... F16K 17/162
  137/910
3,109,553 A * 11/1963 Fike ...................... F16K 17/403
  220/89.2

(Continued)

FOREIGN PATENT DOCUMENTS

| CN | 104329496 B | 1/2017 |
|---|---|---|
| CN | 107763267 B | 7/2019 |
| EP | 3354948 A1 | 8/2018 |

OTHER PUBLICATIONS

European Search Report with English translation in European Application No. 22202569.4, dated Apr. 3, 2023, 12 pages.

(Continued)

*Primary Examiner* — Minh Q Le
(74) *Attorney, Agent, or Firm* — Edell, Shapiro & Finnan, LLC

(57) ABSTRACT

An arrangement for blocking/unblocking a fluid flow comprises: a component delimiting a fluid passage to conduct a fluid from a high pressure side to a low pressure side; a bursting disk at least indirectly attached to the component and separating the high and low pressure sides to close the fluid passage; a support element on the low pressure side, which supports the bursting disk to withstand a fluid pressure on the high pressure side that exceeds a nominal bursting pressure of the bursting disk but that is lower than a maximum pressure; and a controllable actuator actuatable for unblocking the fluid passage. To unblock the fluid passage, the actuator is arranged to destroy or damage the support element such that a fluid pressure on the high pressure side of the bursting disk exceeding the nominal bursting pressure causes the bursting disk to burst.

14 Claims, 8 Drawing Sheets

(58) Field of Classification Search
USPC ......... 137/68.29, 68.19, 68.22, 68.25, 68.28, 137/68.26
See application file for complete search history.

(56) References Cited

U.S. PATENT DOCUMENTS

| | | | | | |
|---|---|---|---|---|---|
| 3,363,801 | A | * | 1/1968 | Fike | F16K 17/403 220/261 |
| 3,731,948 | A | * | 5/1973 | Risko | B60R 21/268 137/68.28 |
| 3,743,318 | A | * | 7/1973 | Yamaguchi | B60R 21/268 137/68.13 |
| 3,834,729 | A | * | 9/1974 | Oka | B60R 21/268 222/3 |
| 3,915,235 | A | * | 10/1975 | Hamilton | F16K 17/403 137/68.13 |
| 4,072,160 | A | * | 2/1978 | Hansen | F16K 17/1613 137/68.26 |
| 4,084,602 | A | * | 4/1978 | Cook | F16K 17/162 137/68.13 |
| 4,579,001 | A | * | 4/1986 | Hosterman | G01L 9/0072 137/68.25 |
| 5,076,312 | A | * | 12/1991 | Powell | B60R 21/268 137/68.25 |
| 5,082,133 | A | * | 1/1992 | Farwell | F16K 17/1613 220/89.2 |
| 6,378,544 | B1 | * | 4/2002 | DiBello | F16K 17/16 137/68.27 |
| 6,543,806 | B1 | * | 4/2003 | Fink | B60R 21/272 222/3 |
| 2010/0127195 | A1 | * | 5/2010 | McLelland | F16K 13/06 251/61.1 |
| 2014/0014194 | A1 | | 1/2014 | Kim | |
| 2016/0102773 | A1 | * | 4/2016 | Smith | F16K 17/38 137/74 |

OTHER PUBLICATIONS

Office Action with English machine translation in European Application No. 22 202 569.4, dated Oct. 8, 2025, 10 pages.

\* cited by examiner

ARRANGEMENT FOR BLOCKING OR UNBLOCKING A FLUID FLOW

CROSS REFERENCE TO RELATED APPLICATIONS

This application claims priority under 35 U.S.C. § 119(a)-(d) to European application No. 22202569.4 filed on Oct. 19, 2022, the entire contents of which are hereby incorporated by reference.

TECHNICAL FIELD

The present disclosure relates to an arrangement for blocking or unblocking a flow of fluids through a component conducting the fluid from a high pressure side to a low pressure side, the component delimiting a fluid passage, wherein the arrangement comprises:
a. the component which guides the fluid,
b. a bursting disk for closing the fluid passage through the component, which separates the high pressure side and the low pressure side, wherein the bursting disk is at least indirectly attached to the component, and
c. a controllable actuator which is actuatable for unblocking the fluid passage.

BACKGROUND

From EP 2 347 151 B1, there are known arrangements having bursting disks which close a fluid passage through a component, wherein an actuator is provided which can provide for an unblocking of the fluid passage when needed. The actuators are arranged on the high pressure side of the bursting disks. In order to unblock the fluid passage, the bursting pressure of the bursting disk is reduced with the aid of the actuators, specifically far enough that its bursting pressure falls below the pressure existing on the high pressure side, so that the pressure existing on the high pressure side is sufficient to cause the bursting disk to burst.

The inventors have made it an object to find an alternative to the known solution.

The inventors have achieved this object in that the arrangement has a support element which is arranged on the low pressure side of the bursting disk and supports the bursting disk so that the bursting disk withstands a pressure of the fluid on the high pressure side that is higher than a nominal bursting pressure of the bursting disk but is lower than a maximum pressure, wherein the actuator and the support element are arranged relative to one another such that, in order to unblock the fluid passage, the actuator can destroy or damage the support element and a pressure of the fluid on the high pressure side of the bursting disk causes the bursting disk to burst if the pressure is higher than the nominal bursting pressure of the bursting disk.

The support element can be a disk which abuts the bursting disk at least partially, advantageously in a region in which the bursting disk is exposed to the pressure prevailing on the high pressure side.

SUMMARY

An arrangement according to the disclosure can be realized with a flat or domed bursting disk, in particular the realization thereof is possible with a forwardly opening bursting disk, a reverse buckling bursting disk, a domed bursting disk, or a flat bursting disk. The disk forming the support element can be at least partially as domed as the bursting disk.

The support element can have a fastening region with which the support element is at least indirectly fastened to the component conducting the fluid. This fastening region can be a ring or a flange. It can surround a domed central region.

Between the fastening region and the region abutting the bursting disk, the support element can have a supporting region by which the forces are conducted from the region of the support element abutting the bursting disk to the fastening region. The actuator can act upon this fastening region to unblock the fluid passage. The support region can be destroyed or damaged so that the forces conducted from the bursting disk into the support element can no longer be conducted away into the fastening region, with the result that the bursting disk then opens.

The actuator can have a plunger and a drive to operate the plunger. In order to unblock the fluid passage, the drive of the actuator can strike the plunger against the supporting region. The drive can be an electric or electromagnetic drive. The drive can also be a propellant charge. This can be ignited electrically.

The support element can have at least one intended breaking site, intended breaking line or suchlike. In particular, the supporting region of a support element can have the intended breaking site, intended breaking line or suchlike or one or more of the intended breaking sites, intended breaking lines or suchlike.

Furthermore, the support element can have slits, holes or perforations.

An arrangement according to the disclosure for blocking or unblocking a flow of fluids can have a manometer and/or a pressure sensor. The manometer and/or pressure sensor can detect the pressure on the high pressure side of the bursting disk. For this purpose, the component can have at least one hole. The manometer and/or the pressure sensor can be inserted into the hole or holes.

BRIEF DESCRIPTION OF THE DRAWINGS

Further features and advantages of an example embodiment of the described arrangement are disclosed in greater detail in the drawings.

DETAILED DESCRIPTION

It is not necessary for an apparatus according to the disclosure to have all the features described below. It is also possible that an apparatus according to the disclosure has only individual features of the exemplary embodiment described below.

Figure 1:
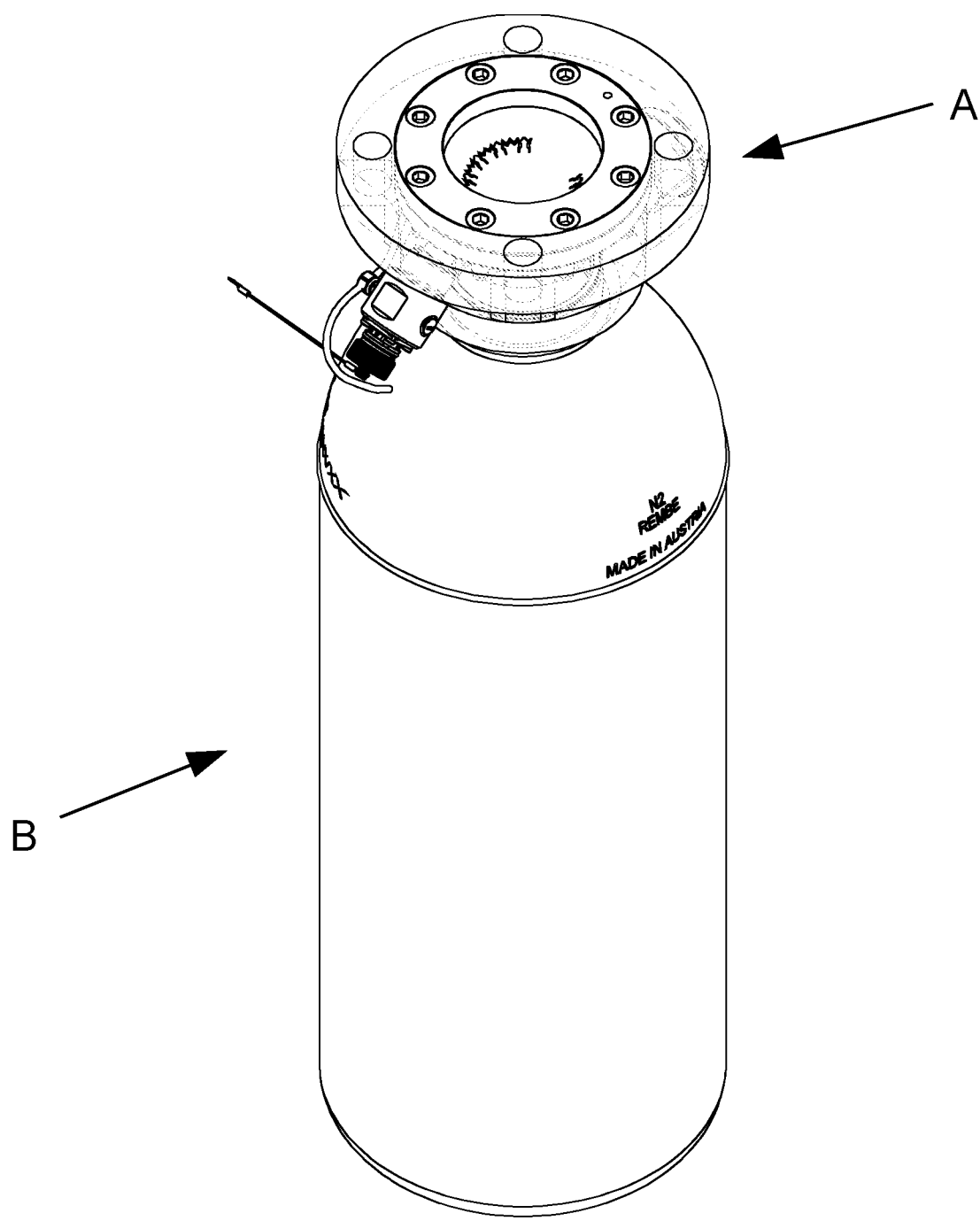
FIG. 1 shows a perspective view of an extinguishing agent bottle which is closed with an arrangement according to the disclosure and can be opened therewith.
Figure 2:
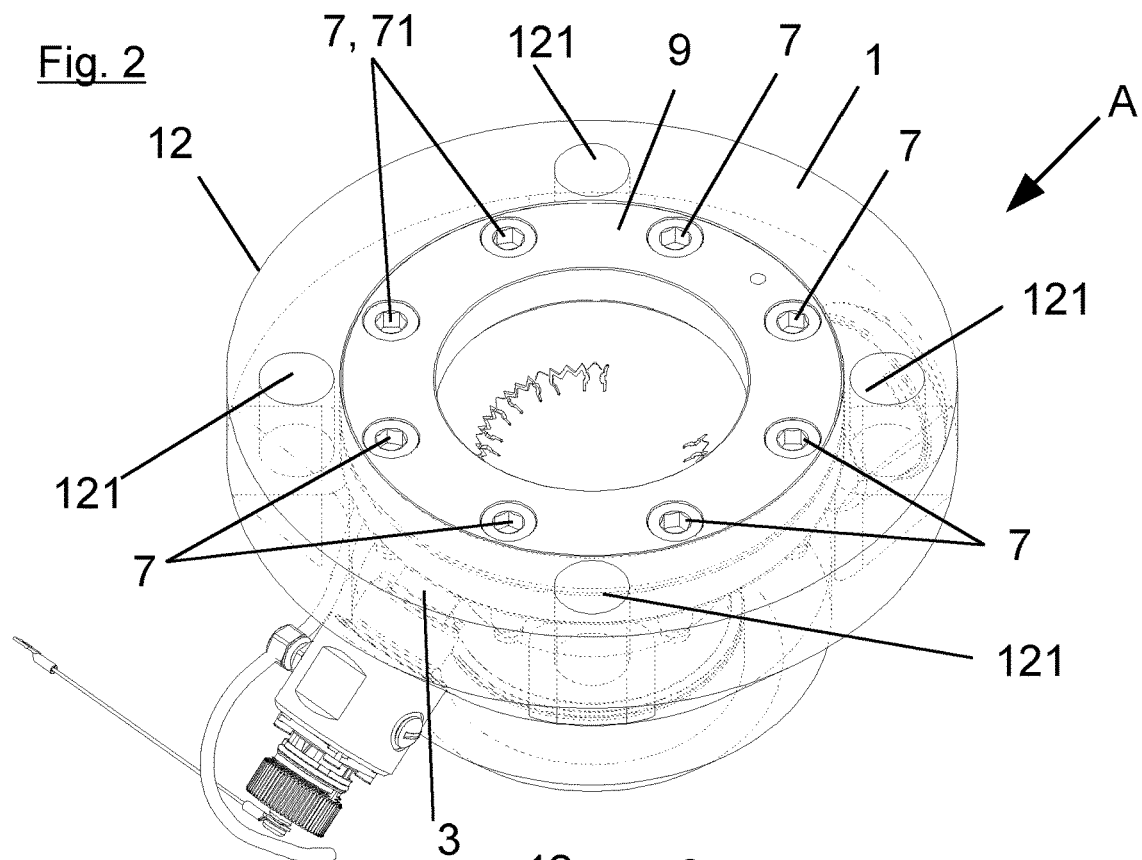
FIG. 2 shows a perspective view of the arrangement.
Figure 3:
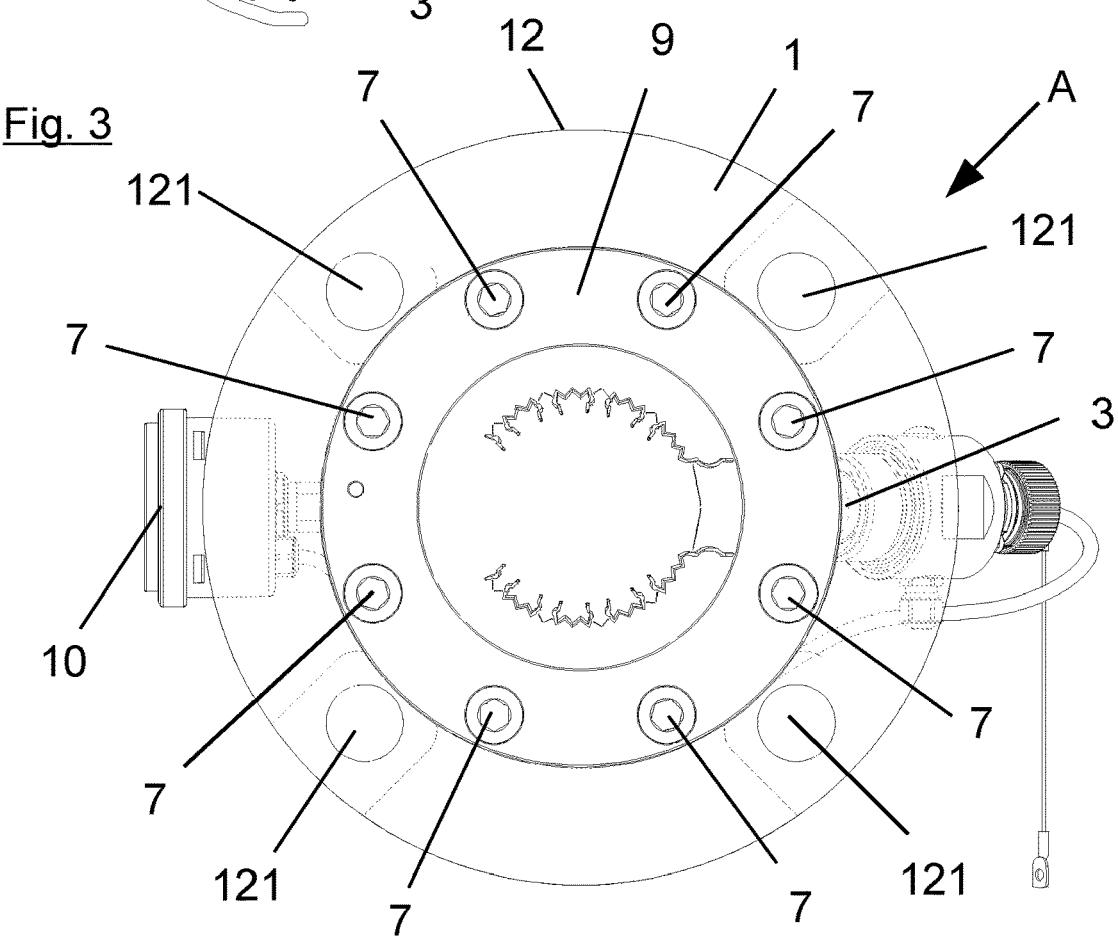
FIG. 3 shows a plan view of the arrangement.
Figure 4:
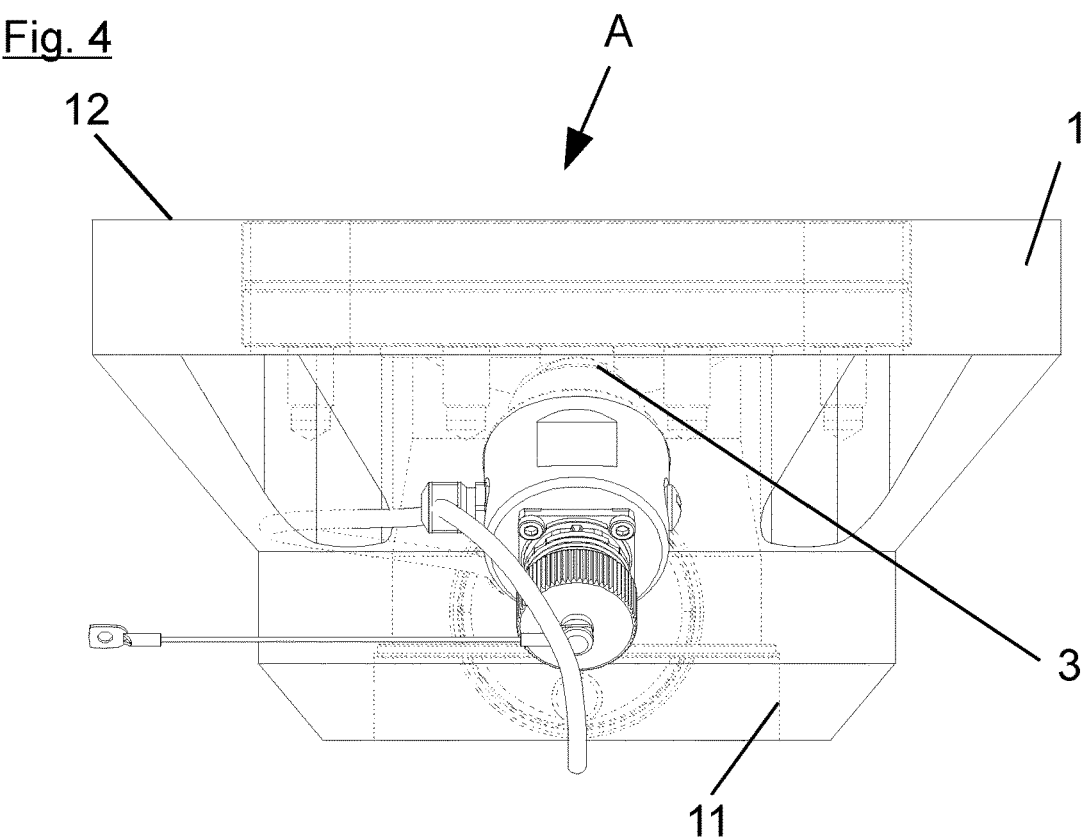
FIG. 4 shows a view of the side of the arrangement on which an actuator of the arrangement is provided.
Figure 5:
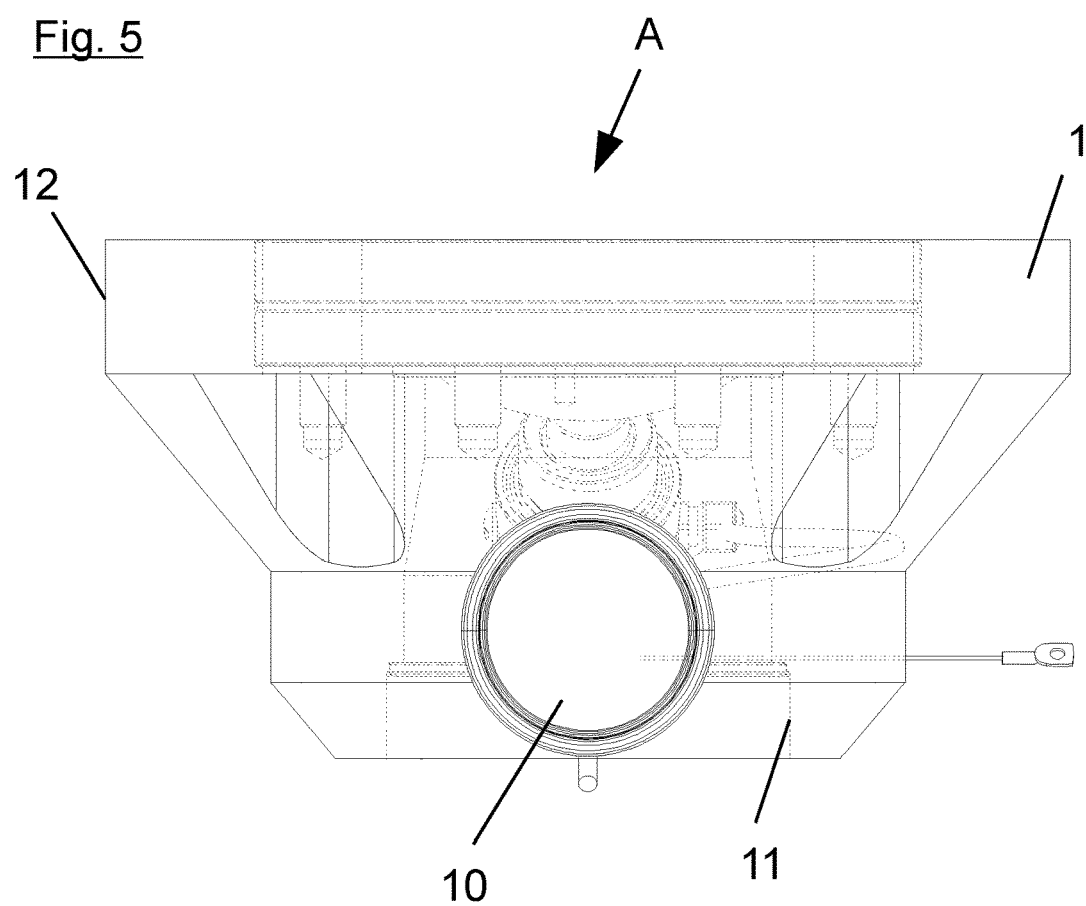
FIG. 5 shows a view of the side of the arrangement on which a manometer is provided.
Figure 6:
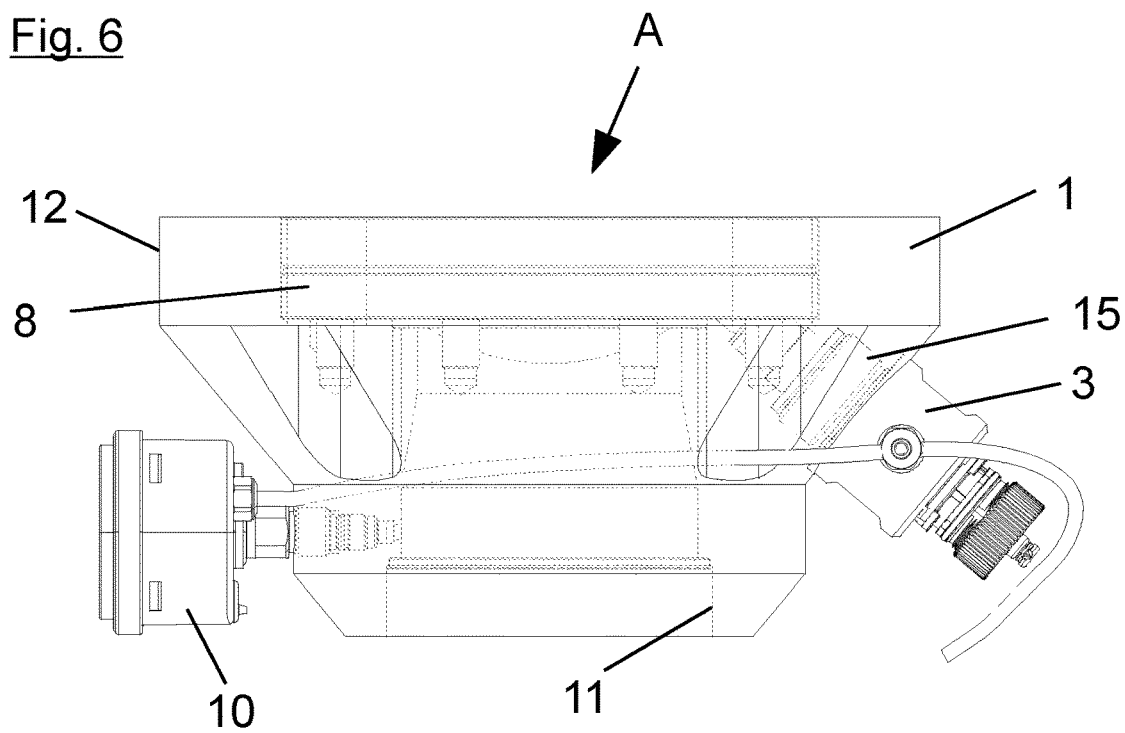
FIG. 6 shows a view of the arrangement from the front.
Figure 7:
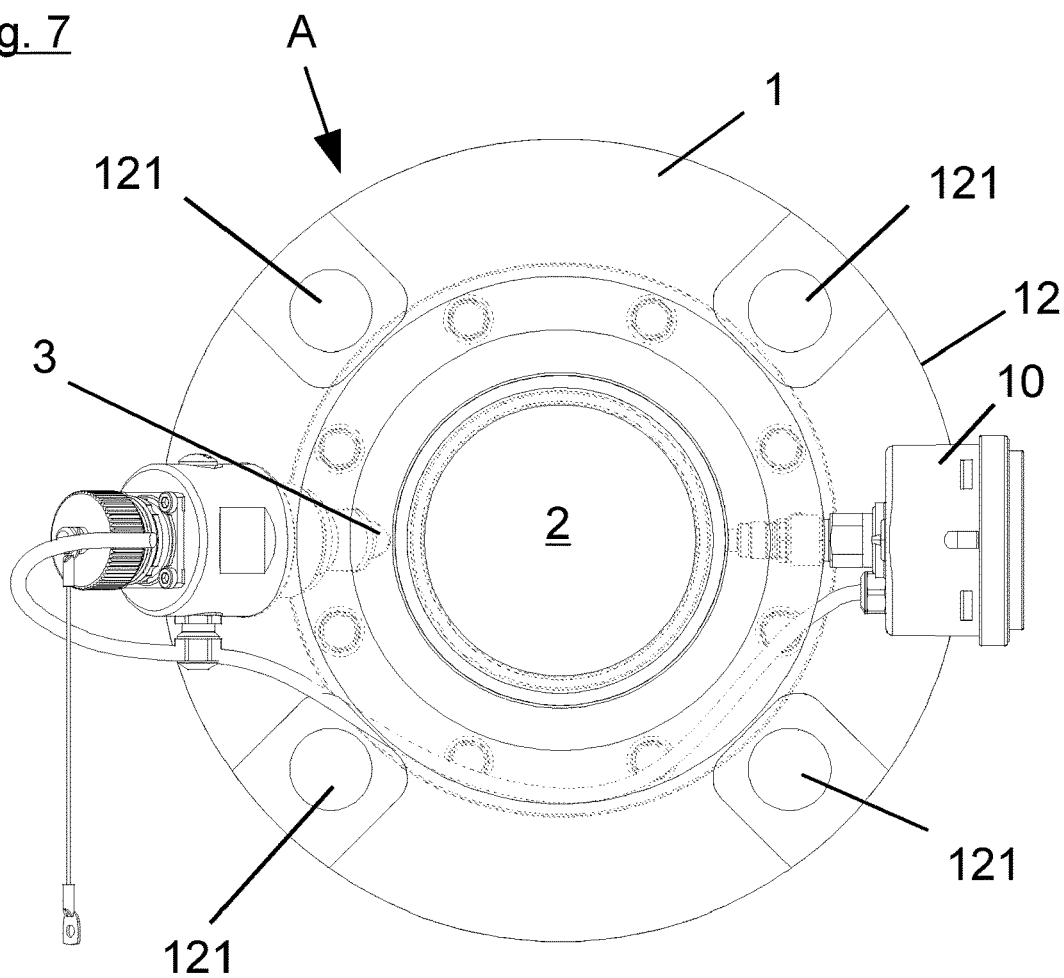
FIG. 7 shows a view of the arrangement from underneath.
Figure 8:
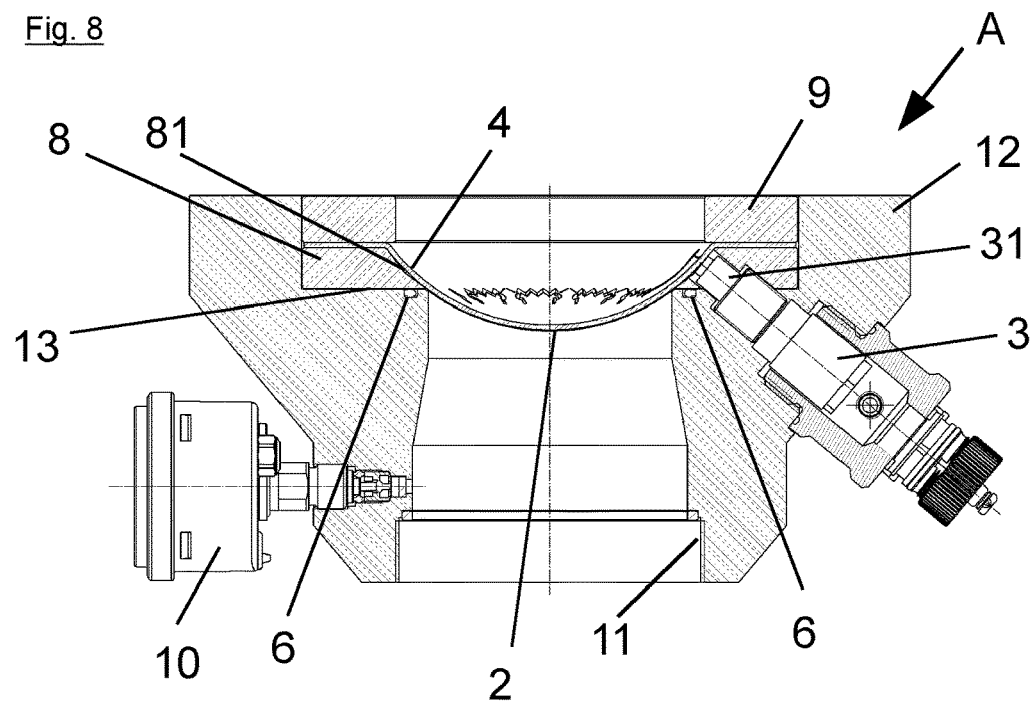
FIG. 8 shows a section through the arrangement along the line VIII-VIII in FIG. 3.
Figure 9:
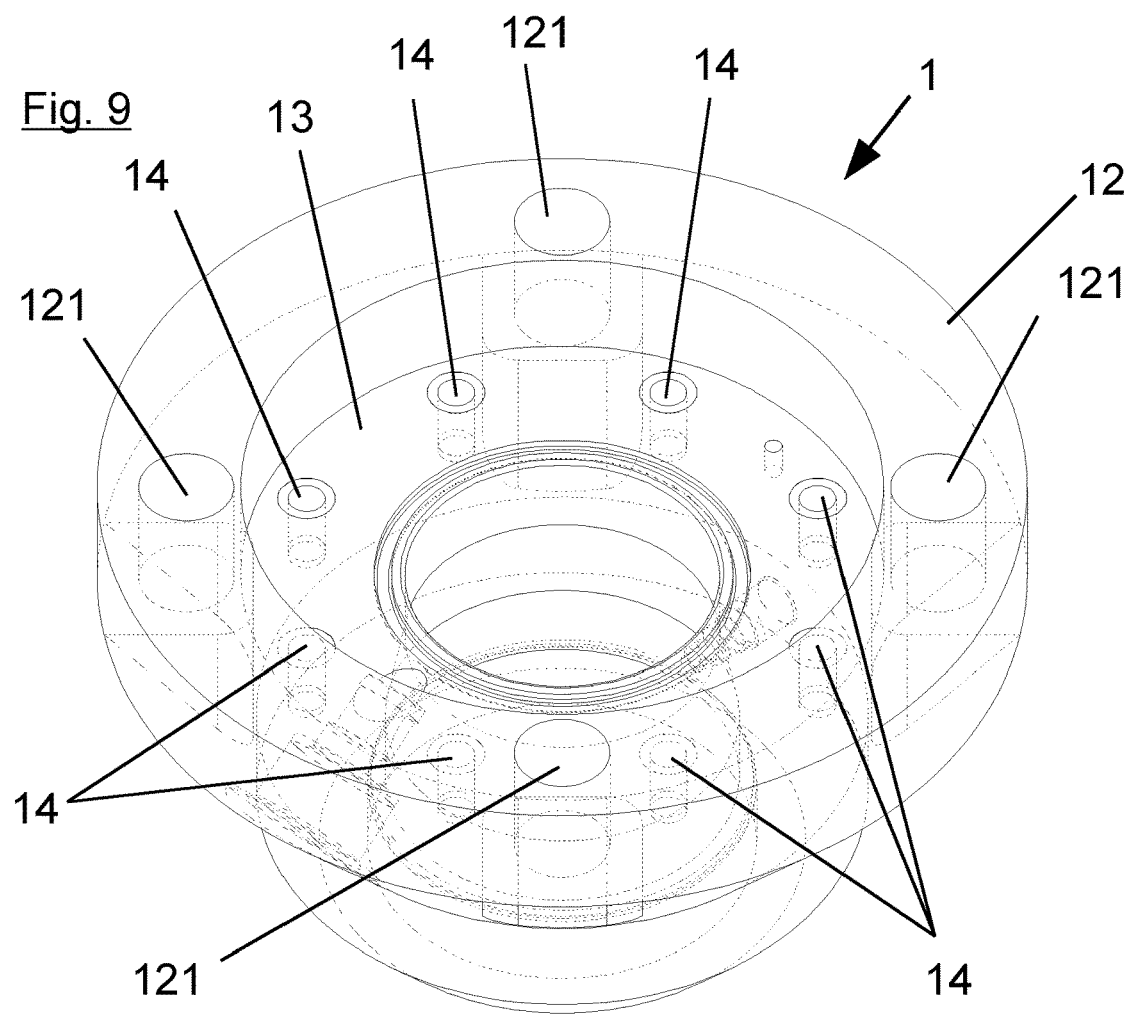
FIG. 9 shows a perspective view of a component of the arrangement with a fluid passage.

The extinguishing agent bottle B shown in FIG. 1 is filled with an extinguishing agent. It can be used in technical installations in order to deliver and introduce extinguishing agent, in particular an extinguishing powder, for example into a container or a conduit, in the event of a fire.

As shown in FIGS. 2-16, the arrangement A according to the disclosure has a component 1 which forms a fluid passage through which the extinguishing agent can emerge from the bottle B. In the normal case, this fluid passage is closed by a bursting disk 2 of the arrangement A.

On a side facing the bottle B at the end of the fluid passage, the component 1 has an internal thread 11 (FIGS. 4-6 and 8) with which a neck of the bottle B can be attached to an external thread at the opening of the bottle B. On the opposite side, the component 1 forms a flange 12 (FIGS. 2-9) by which the extinguishing agent bottle B can be attached to the conduit or the container into which the extinguishing agent is to be introduced. This flange 12 has a plurality of screw holes 121 for screw fastening to a flange of, for example, the conduit or the container.

The fluid passage extends from the internal thread 11 to the flange 12. Provided in the wall delimiting the fluid passage of the component 1 is a shoulder 13 (FIGS. 8 and 9) on which the wall is offset externally, viewed in the direction from the internal thread 11 to the flange. Screw holes 14 (FIG. 9) are provided in the shoulder 13. In addition, a through hole 15 (FIG. 6) is provided through which the actuator 3 (FIGS. 2-4, 6-8, 15, 16) of the arrangement A protrudes. Screws 7 (FIGS. 2, 3) are screwed into the screw holes 14.

Figure 10:
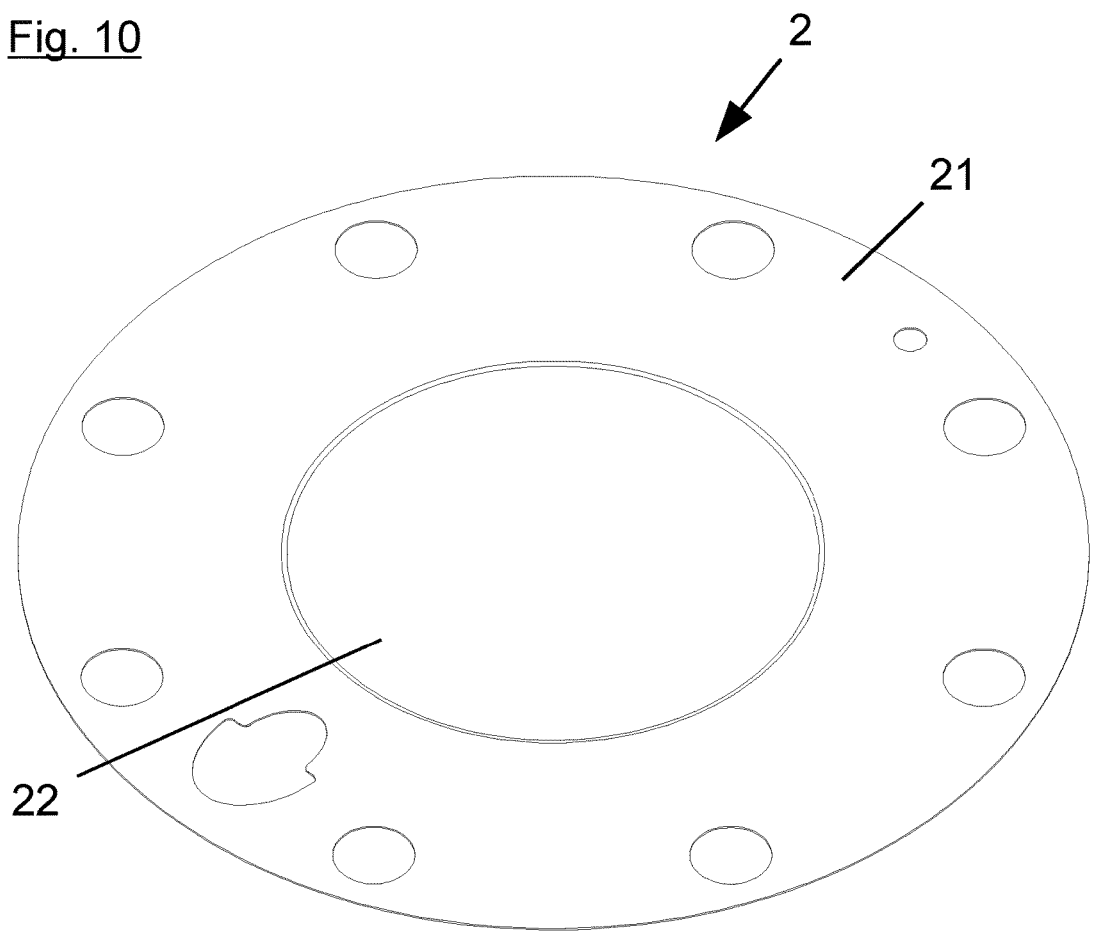
FIG. 10 shows a perspective view of a bursting disk of the arrangement.
Figure 11:
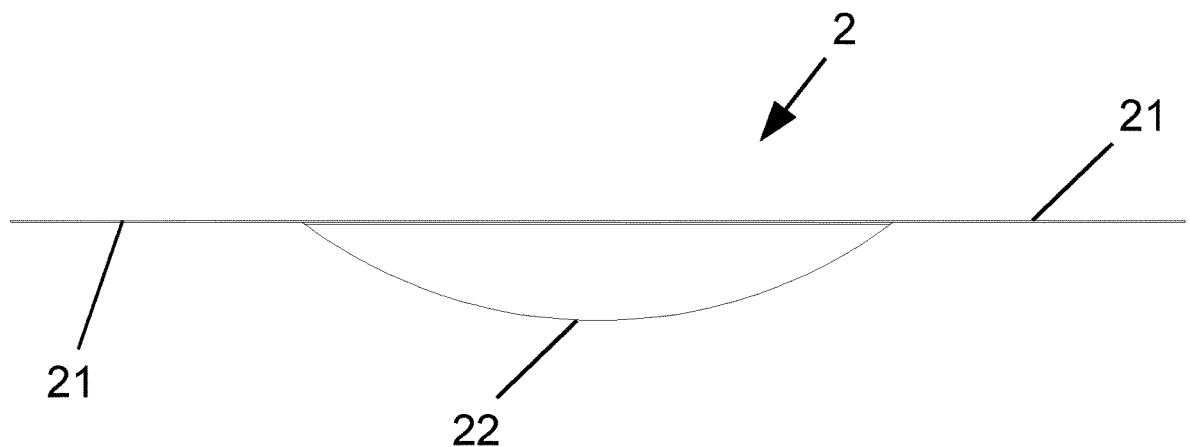
FIG. 11 shows a side view of the bursting disk.
Figure 12:
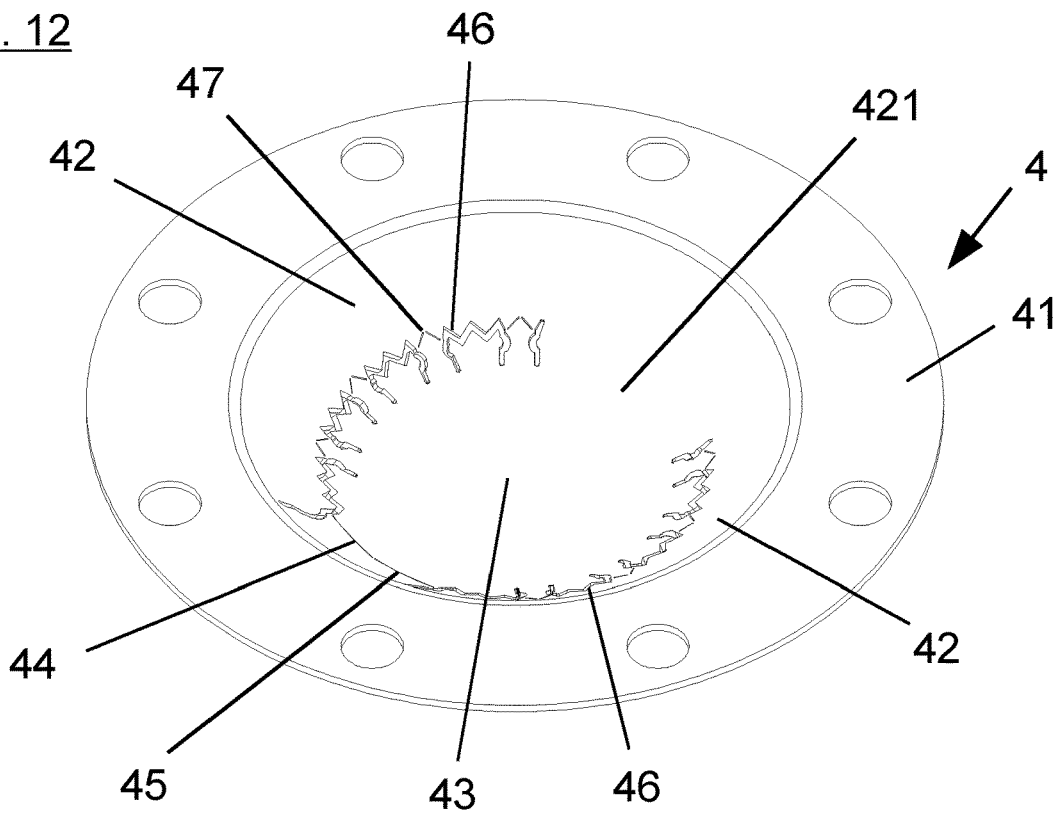
FIG. 12 shows a perspective view of a support element of the arrangement.
Figure 13:
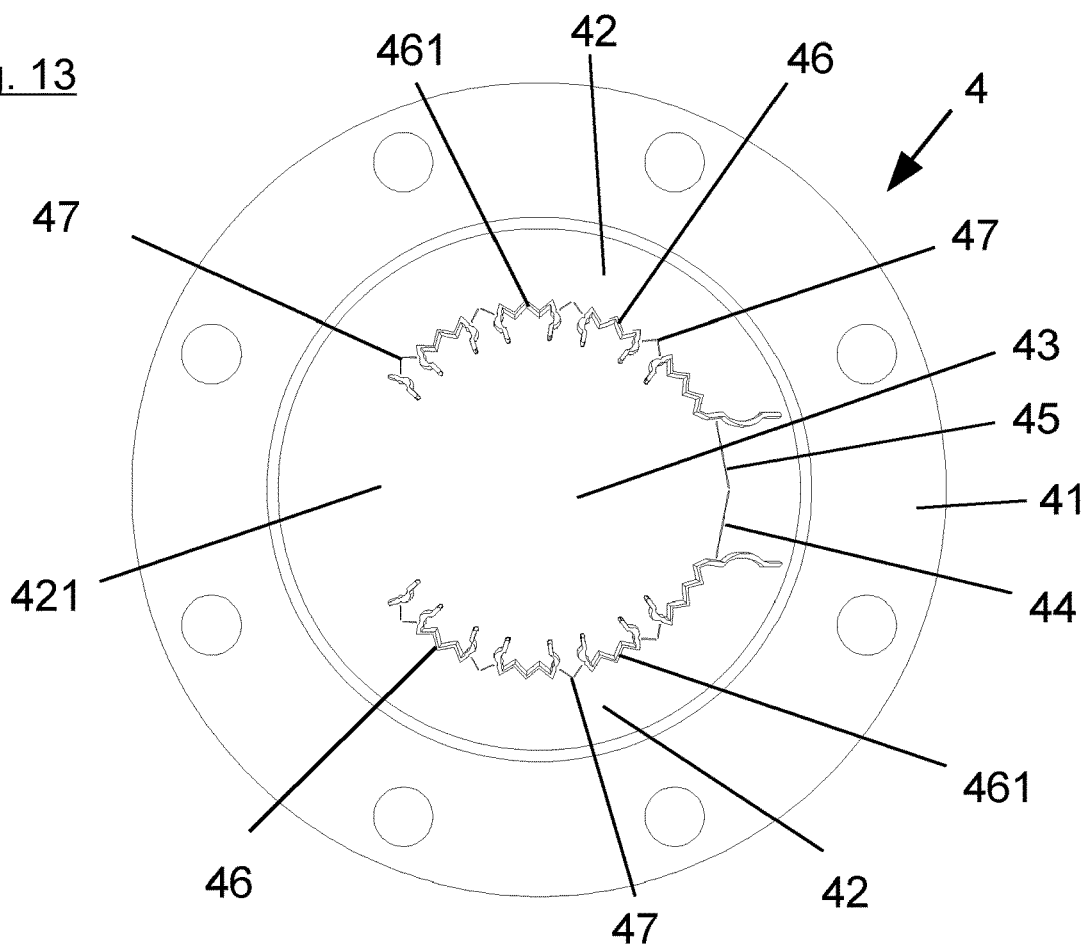
FIG. 13 shows a plan view of the support element.
Figure 14:
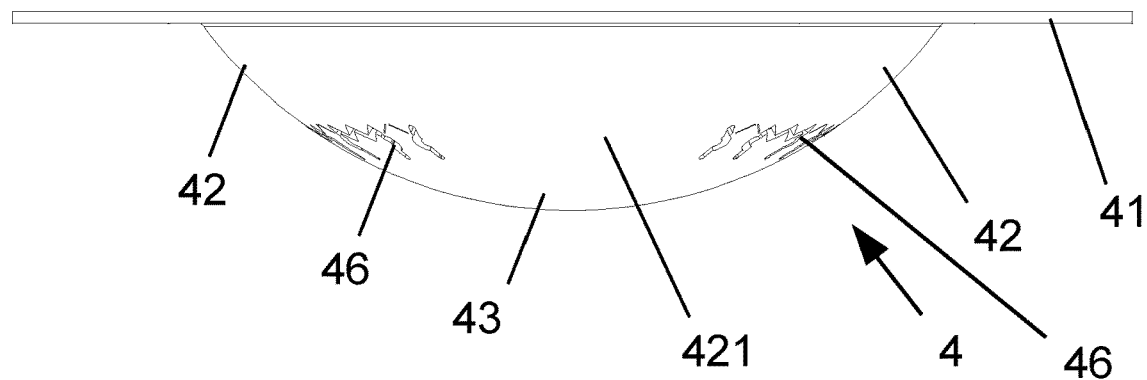
FIG. 14 shows a side view of the support element.
Figure 15:
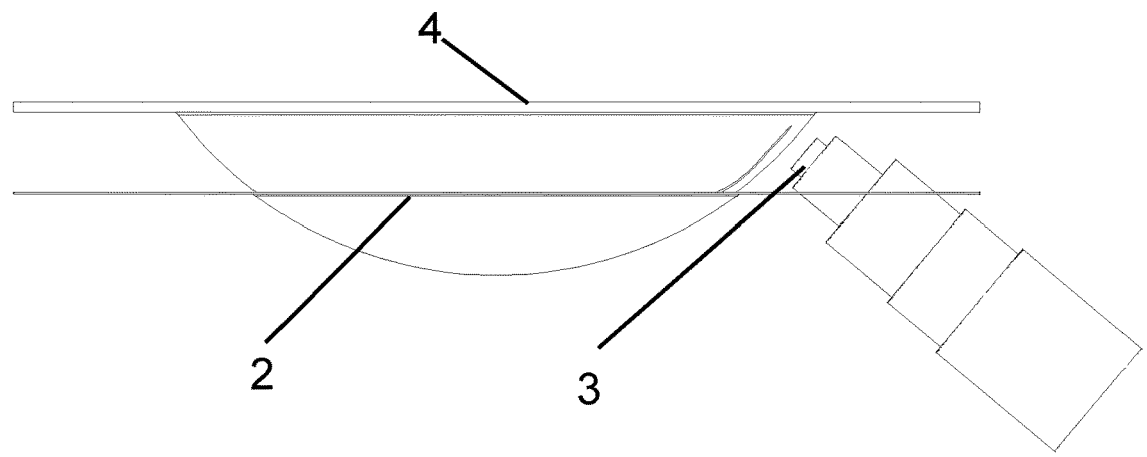
FIG. 15 shows a view of the bursting disk, the support element and the actuator from the front.
Figure 16:
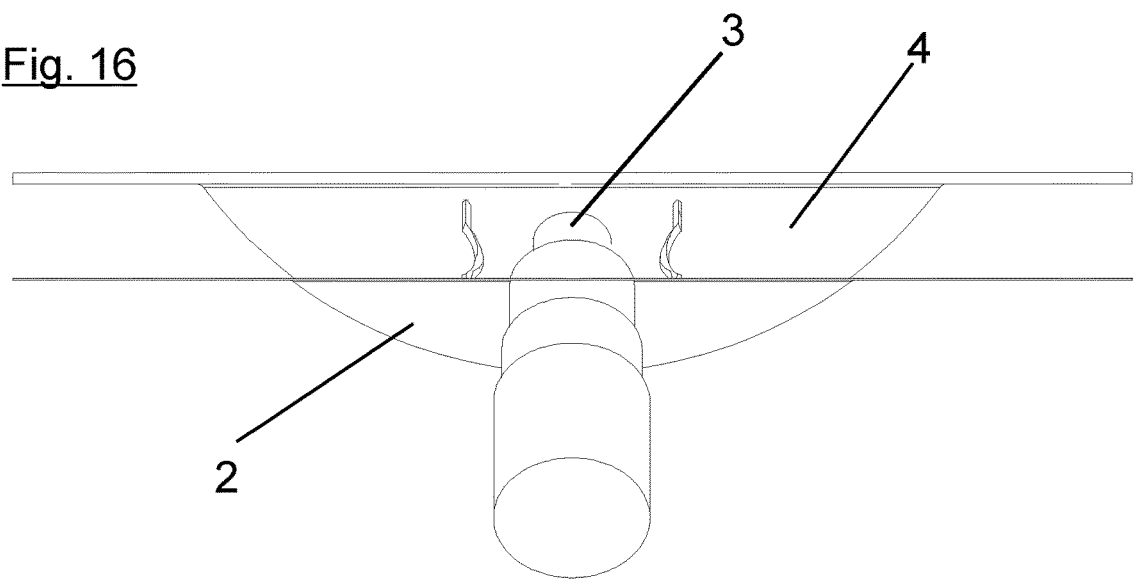
FIG. 16 shows a view of the support element and the actuator from the side on which the actuator is arranged.

The bursting disk 2 of the arrangement A is placed on the shoulder 13. As shown in FIGS. 10 and 11, the bursting disk 2 has an annular, flat fastening region 21 and a domed sealing region 22 which lies within the fastening region 21. The curvature is directed toward the extinguishing agent bottle. The bursting disk 2 is a bursting disk that is domed in the direction of the extinguishing agent bottle. The fluid passage is closed by the bursting disk 2. By an opening of the bursting disk 2, the fluid passage for the egress of the extinguishing agent from the bottle is unblocked. In an edge region of the shoulder 13, a seal 6 (FIG. 8), specifically an O-ring, is provided which prevents the fluid from penetrating between the bursting disk 2 and the component 1. The fastening region 21 of the bursting disk 2 has through holes for the screws 7 which are screwed into the screw holes 14 in the shoulder 13. In addition, a through hole is provided through which the actuator 3 of the arrangement A protrudes.

The bursting disk 2 blocks the fluid passage and separates a high pressure region of the fluid passage, on one side of the bursting disk 2, which opens into the bottle B, from a low pressure region of the fluid passage, on the other side of the bursting disk 2, which opens in the flange 12 of the component 1 forming the fluid passage.

Arranged on the fastening region 21 of the bursting disk 2 is a so-called pressure ring 8 (FIGS. 6 and 8) by which the fastening region 21 of the bursting disk 2 is pressed against the shoulder 13. The pressure ring 8 is a ring which has through holes that are coincident with the screw holes 14 in the shoulder 13 and the through holes in the fastening region 21 of the bursting disk 2 for the screws 7 that are screwed into the screw holes 14. On the side facing toward the bursting disk 2, the pressure ring 8 has a planar area with which the pressure ring lies on the bursting disk 2.

On the side facing away from the bursting disk 2, the pressure ring 8 has a gutter-like concavity 81 which begins at the side of the pressure ring 8 facing away from the bursting disk 2 and ends at an inner side of the pressure ring 8 and extends evenly around the entire circumference of the pressure ring 8. A through hole for the actuator 3 opens into this gutter-like concavity, the hole being a continuation of the through hole of the bursting disk 2 and the component 1 provided for the actuator 3.

The support element 4 (FIGS. 8, 12-16), is placed on the pressure ring 8. The support element 4 is made from a metal sheet, similarly to the bursting disk 2. In the support element 4, at least three regions 41, 42, 43 can be distinguished. Firstly, there is a fastening region 41 which is formed by a flat ring. This fastening region 41 lies on the side of the pressure ring 8 facing away from the bursting disk 2. It has through holes that are coincident with those in the pressure ring 8 and the bursting disk 2 for the screws 7 with which the bursting disk 2, the pressure ring 8 and the support element 4 are fastened on the component 1 which forms the fluid passage.

The fastening region 41 of the support element 4 surrounds a curvature which forms the two further regions 42, 43. Adjoining the fastening region 41, there is firstly an annular support region 42 which, with a side facing toward the bursting disk 2, abuts the gutter-like concavity 81 of the pressure ring 8. It touches a region 43 which does not abut the pressure ring 8, but rather abuts the bursting disk 2. In this region 43 of the support element 4 abutting the bursting disk 2, forces that are conducted into the bursting disk 2 on the high pressure side of the bursting disk 2 are conducted into the support element 4. These forces are then conducted within the support element 4 by way of the support region 42 into the fastening region 41. From there, the forces pass, by way of the screws 7 with which, inter alia, the support element 4 is fastened to the component 1 which forms the fluid passage, the pressure ring 8 and the bursting disk 2, into the component 1.

In the supporting region 42, two long intended breaking lines 44, 45 (FIGS. 12 and 13) are provided which extend almost parallel to an edge of the pressure ring 8 and are formed by a groove in the support element 4. The long intended breaking lines 44, 45 extend over an angle of approximately 25° to 35°. The through hole of the pressure ring 8, into which the actuator 3 projects, ends at these intended breaking lines. By an actuation of the actuator 3, it can act upon the long intended breaking lines 44, 45.

Beginning approximately at the ends of the long intended breaking lines 44, 45 are slits 46 (FIGS. 12-14) which have a zigzag path and each extend at a spacing from the aforementioned edge of the pressure ring 8 along this edge over angular regions from approximately 85° to 115°. A zigzag slit 46 could begin at the end of each of the intended breaking lines 44, 45. In the example shown, there is a plurality of successive zigzag slits 46 which are interrupted by sections which form webs between the slits 46. These webs can have short intended breaking lines 47. A section 421 of the supporting region 42 opposite the long intended breaking line 44, 45 is free of slits and intended breaking lines. This section 421 forms a hinge, as described below.

A locking ring 9 (FIGS. 2, 3, 8) is placed upon the fastening region of the support element 4. This also has through holes for the screws 7 which are screwed into the screw holes 14 in the shoulder 13 of the component 1 which forms the fluid passage. The through holes have two steps. A first step facing away from the bursting disk 2, which has a first diameter and a second step facing toward the bursting disk 2, which has a second diameter that is smaller than the first diameter. The screws 7 are inserted through these through holes. The heads 71 of the screws 7 have a diameter that is smaller than the first diameter and larger than the second diameter and abut a shoulder between the two steps. By tightening the screws 7, the locking ring 9, the support element 4, the pressure ring 8 and the bursting disk 2 are pulled against the shoulder 13 of the component 1 which forms the fluid passage.

The actuator 3 which is inserted into the component and is fastened there and protrudes through the fastening region 21 of the bursting disk 2 and projects into the pressure ring 8 has a housing in which a propellant charge and a plunger 31 (FIG. 8) are arranged. If the propellant charge is electrically ignited, the plunger 31 speeds forward and impacts against the long intended breaking lines 44, 45 in the supporting region 41 of the support element 4. As a result of this impact, the long intended breaking lines 44, 45 break. What follows now is a chain reaction: the pressure bearing upon the high pressure side of the bursting disk 2 can no longer be conducted away by the support element 4 as before due to the broken long intended breaking lines 44, 45. The bursting disk 2 thereby presses against the still remaining short intended breaking lines 46 which, due to this pressure, also break. The pressure bearing upon the bursting disk 2 is then even less able to be conducted away by the support element 4. It is then only the hinge 421 (FIGS. 12-14) that connects the region 43 of the support element 4 abutting the bursting disk 2 and the fastening region 41 of the support element 4 by way of which the force coming from the bursting disk 2 can be conducted into the component 1 to one another and can conduct the force away into the component 1. The bursting disk therefore presses into the zigzag edges 461 (FIG. 13) of the slits 46 of the support element 4, and simultaneously, the bursting disk 2 begins to pivot. During the pivoting, the zigzag edges 461 tear the bursting disk 2 open. The hinge 421 and the tearing of the bursting disk 2 along the zigzag edges 461 of the slits 46 in the support element 4 bring about a controlled opening of the bursting disk 2, as far as possible without parts of the bursting disk 2 tearing off and being carried along with the fluid flowing out of the bottle B.

In the component 1 which forms the fluid passage, a through hole is provided in a part adjoining the bottle B, by way of which, firstly, the bottle B can be filled and, secondly, a manometer 10 (FIGS. 3, 5-8) is connected with which the pressure of the fluid in the bottle B can be monitored. In addition, a pressure sensor can be provided with which pressure can be measured on the high pressure side of the bursting disk.

What is claimed is:
1. An arrangement for blocking or unblocking a fluid flow, comprising:
a component delimiting a fluid passage to conduct a fluid from a high pressure side to a low pressure side;
a bursting disk at least indirectly attached to the component to close the fluid passage through the component, the bursting disk separating the high pressure side from the low pressure side;
a support element arranged on the low pressure side of the bursting disk to support the bursting disk to withstand fluid pressure on the high pressure side that exceeds a nominal bursting pressure of the bursting disk but is lower than a maximum pressure;
a controllable actuator actuatable for unblocking the fluid passage, the actuator being arranged to enable damage to or destruction of the support element such that fluid pressure on the high pressure side exceeding the nominal bursting pressure of the bursting disk causes the bursting disk to burst;
wherein the support element has a fastening region with which the support element is at least indirectly fastened to the component; and
wherein the support element has an abutting region abutting the bursting disk and a supporting region between the fastening region and the abutting region, the supporting region being configured and positioned to cooperate with the actuator to unblock the fluid passage.

2. The arrangement of claim 1, wherein the bursting disk is a domed bursting disk.

3. The arrangement of claim 2, wherein the domed bursting disk is a bursting disk domed toward the high pressure side.

4. The arrangement of claim 1, wherein the bursting disk is a flat bursting disk.

5. The arrangement of claim 1, wherein the bursting disk is a forwardly opening bursting disk.

6. The arrangement of claim 1, wherein the bursting disk is a reverse buckling bursting disk.

7. The arrangement of claim 1, wherein the support element has at least one intended breaking site or intended breaking line.

8. The arrangement of claim 1, wherein the support element includes slits.

9. An arrangement for blocking or unblocking a fluid flow, comprising:
a component delimiting a fluid passage to conduct a fluid from a high pressure side to a low pressure side;
a bursting disk at least indirectly attached to the component to close the fluid passage through the component, the bursting disk separating the high pressure side and the low pressure side;
a support element arranged on the low pressure side of the bursting disk to support the bursting disk to withstand fluid pressure on the high pressure side that exceeds a nominal bursting pressure of the bursting disk but is lower than a maximum pressure;
a controllable actuator actuatable for unblocking the fluid passage, the actuator being arranged to enable damage to or destruction of the support element such that fluid pressure on the high pressure side exceeding the nominal bursting pressure of the bursting disk causes the bursting disk to burst;
wherein the bursting disk has an annular, flat fastening region and a domed sealing region which lies within the fastening region;
wherein the support element has an abutting region abutting the bursting disk;
wherein the support element is a disk that at least partially abuts the bursting disk in the sealing region in which the bursting disk is exposed to the pressure prevailing on the high pressure side; and wherein the disk forming the support element is at least partially domed.

10. An arrangement for blocking or unblocking a fluid flow, comprising:

a component delimiting a fluid passage to conduct a fluid from a high pressure side to a low pressure side;

a bursting disk at least indirectly attached to the component to close the fluid passage through the component, the bursting disk separating the high pressure side and the low pressure side;

a support element arranged on the low pressure side of the bursting disk to support the bursting disk to withstand fluid pressure on the high pressure side that exceeds a nominal bursting pressure of the bursting disk but is lower than a maximum pressure; and a controllable actuator actuatable for unblocking the fluid passage, the actuator being arranged to enable damage to or destruction of the support element such that fluid pressure on the high pressure side exceeding the nominal bursting pressure of the bursting disk causes the bursting disk to burst;

wherein the support element has a fastening region with which the support element is at least indirectly fastened to the component; and wherein the support element has an abutting region abutting the bursting disk and a supporting region between the fastening region and the abutting region, by said supporting region the forces are conducted from the region of the support element abutting the bursting disk to the fastening region.

11. The arrangement of claim 10, wherein the supporting region is configured to cooperate with the actuator to unblock the fluid passage.

12. The arrangement of claim 11, wherein the actuator includes a plunger and a drive to operate the plunger, wherein the drive of the actuator impacts the plunger against the supporting region to unblock the fluid passage.

13. The arrangement of claim 11, wherein the support element includes slits in the supporting region.

14. An arrangement for blocking or unblocking a fluid flow, comprising:

a component delimiting a fluid passage to conduct a fluid from a high pressure side to a low pressure side;

a bursting disk at least indirectly attached to the component to close the fluid passage through the component, the bursting disk separating the high pressure side and the low pressure side;

a support element arranged on the low pressure side of the bursting disk to support the bursting disk to withstand fluid pressure on the high pressure side that exceeds a nominal bursting pressure of the bursting disk but is lower than a maximum pressure;

a controllable actuator actuatable for unblocking the fluid passage, the actuator being arranged to enable damage to or destruction of the support element such that fluid pressure on the high pressure side exceeding the nominal bursting pressure of the bursting disk causes the bursting disk to burst;

wherein the support element has a fastening region with which the support element is at least indirectly fastened to the component;

wherein the support element has an abutting region abutting the bursting disk and a supporting region between the fastening region and the abutting region, the supporting region being configured to conduct forces from the region of the support element abutting the bursting disk to the fastening region and to cooperate with the actuator to unblock the fluid passage;

wherein the actuator includes a plunger and a drive to operate the plunger, wherein the drive of the actuator impacts the plunger against the supporting region to unblock the fluid passage;

wherein the support element has at least one intended breaking site or intended breaking line in the supporting region; and wherein on actuation of the actuator the plunger speeds forward to impact against intended breaking lines in the supporting region of the support element, wherein the breaking lines are configured to break in response to said impact.

* * * * *